(12) United States Patent
Tran et al.

(10) Patent No.: US 10,572,483 B2
(45) Date of Patent: Feb. 25, 2020

(54) AGGREGATE PROJECTION

(71) Applicant: Hewlett Packard Enterprise Development LP, Houston, TX (US)

(72) Inventors: Hoa Binh Nga Tran, Cambridge, MA (US); Charles Edward Bear, Cambridge, MA (US); Vivek Bharathan, Cambridge, MA (US); Jaimin Mukesh Dave, Cambridge, MA (US)

(73) Assignee: MICRO FOCUS LLC, Santa Clara, CA (US)

( * ) Notice: Subject to any disclaimer, the term of this patent is extended or adjusted under 35 U.S.C. 154(b) by 232 days.

(21) Appl. No.: 15/312,955

(22) PCT Filed: Jun. 9, 2014

(86) PCT No.: PCT/US2014/041580
§ 371 (c)(1),
(2) Date: Nov. 21, 2016

(87) PCT Pub. No.: WO2015/191032
PCT Pub. Date: Dec. 17, 2015

(65) Prior Publication Data
US 2017/0185649 A1 Jun. 29, 2017

(51) Int. Cl.
*G06F 17/30* (2006.01)
*G06F 16/2455* (2019.01)
*G06F 16/21* (2019.01)
*G06F 16/22* (2019.01)

(52) U.S. Cl.
CPC ...... *G06F 16/24556* (2019.01); *G06F 16/211* (2019.01); *G06F 16/221* (2019.01); *G06F 16/24553* (2019.01)

(58) Field of Classification Search
CPC ......... G06F 17/30489; G06F 17/30483; G06F 17/30315; G06F 17/30292; G06F 16/24556; G06F 16/24553; G06F 16/221; G06F 16/211
USPC ....................................................... 707/791
See application file for complete search history.

(56) References Cited

U.S. PATENT DOCUMENTS

| | | | |
|---|---|---|---|
| 5,465,352 A | 11/1995 | Nakazawa et al. | |
| 8,635,229 B2 | 1/2014 | Cummings et al. | |
| 8,700,674 B2 | 4/2014 | Bear et al. | |
| 2004/0172400 A1* | 9/2004 | Zarom | G06F 16/90339 |
| 2006/0230017 A1* | 10/2006 | Larson | G06F 16/24539 |
| 2007/0061318 A1* | 3/2007 | Azizi | G06F 16/24 |
| 2008/0263000 A1 | 10/2008 | West et al. | |

(Continued)

FOREIGN PATENT DOCUMENTS

CN 103294831 A 9/2013

OTHER PUBLICATIONS

Paul Lane: Oracle® Database Data Warehousing Guide 11g Release 2 (11.2), E25554-02, Jul. 2013 (Year: 2013).*

(Continued)

*Primary Examiner* — Kuen S Lu

(57) ABSTRACT

In an example, an aggregate function is associated with an aggregate projection for a data storage system. Input data to be loaded into the data storage system is aggregated according to the aggregate function and stored in the aggregate projection.

17 Claims, 5 Drawing Sheets

(56) References Cited

U.S. PATENT DOCUMENTS

| | | | |
|---|---|---|---|
| 2011/0252073 A1* | 10/2011 | Pauly | G06F 16/213 |
| | | | 707/812 |
| 2012/0005190 A1* | 1/2012 | Faerber | G06F 16/2433 |
| | | | 707/718 |
| 2013/0166497 A1 | 6/2013 | Schroetel et al. | |
| 2013/0311446 A1* | 11/2013 | Clifford | G06F 11/3409 |
| | | | 707/719 |

OTHER PUBLICATIONS

Randy Urbano: Oracle® Database Advanced Replication 11g Release 2 (11.2), E10706-04, Aug. 2010 (Year: 2010).*
Oracle® Database Data Warehousing Guide 11g Release 2 (11.2) Jul. 2013.*
International Searching Authority, "Notification of Transmittal of the International Search Report and the Written Opinion", PCT/US2014/041580, dated Feb. 27, 2015, 9 pages.
Papadias, D. et al., "Indexing and Retrieval of Historical Aggregate Information About Moving Objects," (Research Paper), Apr. 15, 2002, 8 pages.

* cited by examiner

AGGREGATE PROJECTION

BACKGROUND

In traditional database architectures, data is stored in database tables. Additionally, structures such as indexes are created for improved query performance.

When a query is received, the database tables are searched for matching results. Instead of having to read every record in a database table to search for matches, which can take a significant amount of time especially for large tables, indexes may be used to reduce the search time for identifying records matching the query.

Indexing is a way of sorting records on a field or multiple fields. Creating an index on a field in a database table creates another data structure which may hold, for each field value, a pointer that points to its related record. The index is sorted, so a faster search can be performed on the index, which typically does not require accessing every record stored in the database table.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
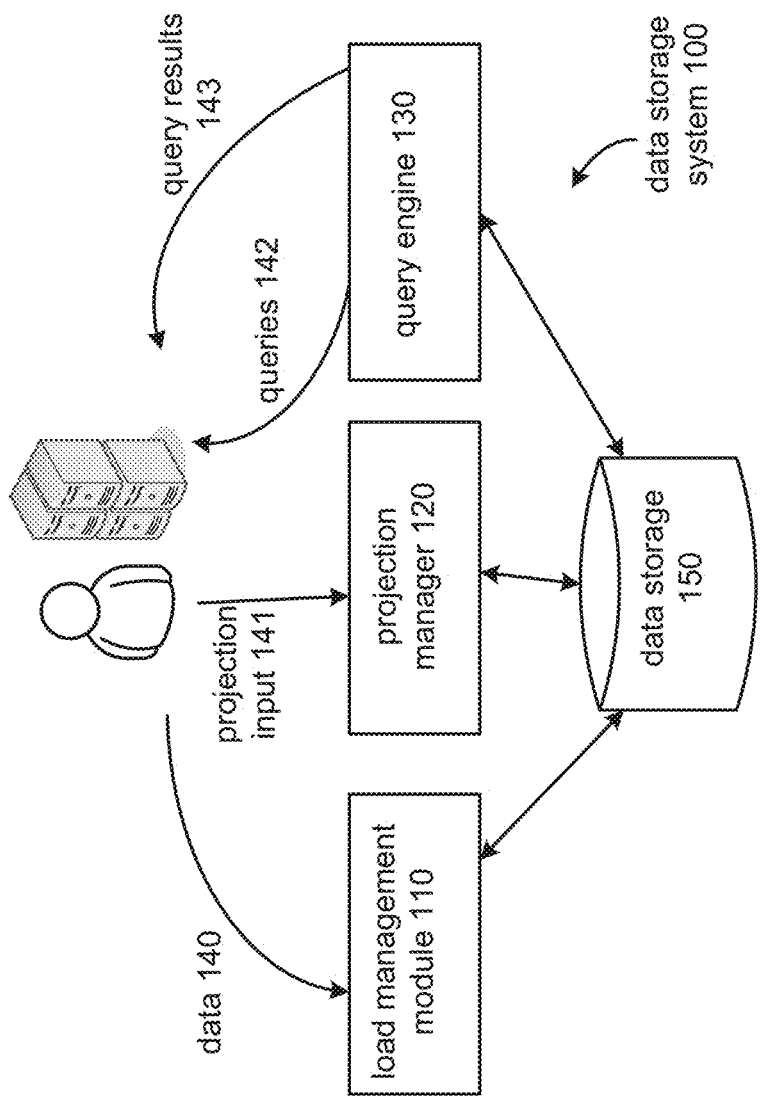
FIG. 1 shows a block diagram of a data storage system, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure.

According to an example, a data storage system can create and store data in aggregate projections, and run queries on aggregate projections. The data storage system performs database functions, such as storing data, running queries on the stored data, etc. The aggregate projections and other projections used by database storage system facilitate optimized query execution, and indexes may not be used in the data storage system to run queries.

The data storage system stores data in projections. A projection is an optimized collection of table columns that provide physical storage for data. A projection is a data structure that can contain one, some or all of the columns of one or more database tables and the projections contain the actual data of the columns, which may be compressed. A projection that contains all of the columns of a database table is called a super projection. Even though projections are used, the database schema, e.g., identifying fields (i.e., columns), foreign keys, primary keys, etc., is supported by the projections. Also, the data storage system can execute standard database commands but the execution of the commands is performed on the projections rather than on typical database tables.

As indicated above, a projection is an optimized collection of table columns. Optimization refers to the improvement of performance of a database function, such as storage, query execution, etc. For example, columns can be selected for a projection to improve the speed of executing a query.

An aggregate projection is a projection that includes a column representing results of an aggregate function executed on at least one other column of the projection. An aggregate function summarizes values of at least one column according to the specified function. The summarized values are summarized over a group of rows which may be defined by a group by clause. The data storage system supports the following functions for aggregate projections: creating an aggregate projection; insert and copy (bulk load) data into an aggregate projection; select data from an aggregate projection; update data of an aggregate projection; delete data from an aggregate projection and drop a partition of an aggregate projection; merge data of an aggregate projection that is stored in different physical containers; refresh data for an aggregate projection; recover data for an aggregate projection after a node of a cluster is down and then brought back up; rebalance data of an aggregate projection when new nodes are added to a cluster of nodes of the data storage system; and backup and recovery of data.

An aggregate projection can store results of an aggregate function in a column of the aggregate projection. The aggregate function may be based on a predetermined query that is commonly executed for a user. The results of the aggregate function can be stored in the column prior to receiving the predetermined query. Accordingly, when a query is received that is based on the aggregate function, the results can be quickly provided to the user from the aggregate projection. Thus, query execution performance is improved, i.e., faster.

The data storage system for example may not use indexes and traditional database tables to store data and run queries, such as in a conventional database management system. Instead, the projections, including the aggregate projections, are used to store data and run queries. For example, instead of storing a database table including rows of data and indexes for the table, the data storage system stores the data in a super projection and other projections, and executes queries on the projections. Execution of queries on projections may be faster than using indexes and database tables to execute the queries if the projections are optimized for the particular queries. Also, the data storage system does not need to waste storage on indexes.

FIG. 1 is an example of a data storage system 100 that uses projections, including aggregate projections, to execute database functions, including storing data and running queries. The data storage system 100 includes a load management module 110, a projection manager 120 and a query engine 130. The data storage system 100 also includes data storage 150 to store projections including data 140, a projection catalog, and other information used by the data storage system 100. The data storage 150 may include disks, memory and/or other types of storage mediums.

Computers or users may provide data 140 (e.g., input data) for storage in projections in the data storage system 100, provide projection input 141 for creating or modifying projections, send queries 142, and get query results 143 from the data storage system 100. For example, the load management module 110 receives the data 140 and stores the data in the corresponding projections. A traditional relational database has at least one table including columns for storing data. One or more projections may be stored in the data storage system 100, including columns of the table, instead of storing traditional database tables and indexes. However, information about the database schema, tables for the schema, projections, etc., may be stored in the data storage system 100 so the data storage system 100 can identify and store data in the corresponding projections and run queries on the projections that optimize query performance.

When an instruction or command is received to load the data 140 into a table, the load management module 110 stores the data in the projections. For example, the data storage system 100 supports conventional database languages, such as structured query language (SQL). The load management module 110 receives a SQL load command to load data into a table, such as INSERT (row by row) or COPY (bulk load a set of rows) command, and loads the data in the projections. Received data is loaded into a super projection, which includes all the columns of the database table, and is loaded into other projections. The load management module 110 also directs the appropriate data of columns to the right target projections. For example, a projection catalog stored in the data storage 150 stores information about each projection in the data storage system, including the columns of each projection. The load management module 110 directs the appropriate data of columns to the right target projections based on descriptions of the projections in the projection catalog.

For example, the load management module 110 performs expression evaluation on received load commands through the operator ExprEval to load data into the projections. For normal projections, the ExprEval operator directs the columns to the right order. For aggregate projections, the ExprEval operator may also compute expressions and then pass the expressions to a group by operator, which aggregates data and passes the aggregated data to the target aggregate projection. In one example, the aggregation is done on the received data to be inserted or bulk-loaded into the projections rather than aggregating on both the received data and the data already in the projections. For example, the existing data in the aggregate projection is not aggregated with the received data to be inserted or bulk-loaded into the aggregate projection. Thus, the aggregate projection can store partially aggregated data.

The query engine 130 receives queries 142 which may be in SQL and executes the queries on the stored projections to return query results 142. For example, a user or system submits a query to the data storage system 100. The query engine 130 parses the query and chooses the best projection(s) for the query by referencing the projection catalog. For example, the projection catalog 300 stores information about the projections and their columns, including identifier, user, schema, related database table, and other information. A projection may be identified that already stores the query results in a column. For example, a particular aggregate projection has a column storing results for an aggregate function. If the query is requesting the same aggregated data stored in the column, the query engine 130 runs the query on the aggregate projection. If no projection is optimized for the received query, the query may be executed on the super projection. The query results are returned to the system or end user that sent the query.

The projection manager 120 creates and manages projections and stores information about the projections in the projection catalog. Projection input 141 may be provided by a user or system. The projection input 141 may include commands for creating or modifying projections. The projection manager 120 creates or modifies the projections according to the commands, and updates the projection catalog if needed. For example, information for a new projection, such as an aggregate projection, is stored in the projection catalog.

Figure 2:
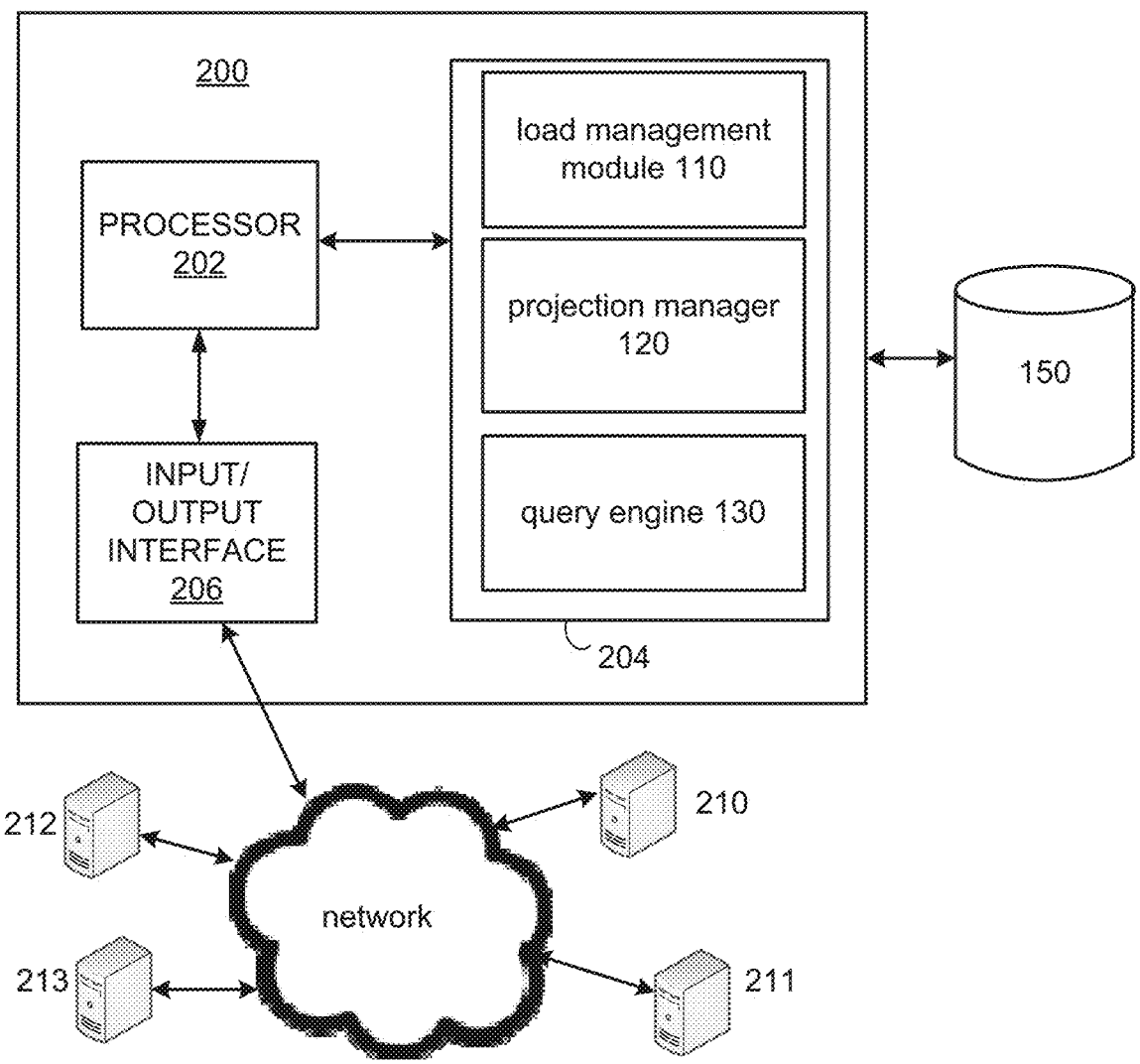
FIG. 2 shows a block diagram of a computer platform for the data storage system, according to an example of the present disclosure.

FIG. 2 illustrates a block diagram of computer 200, including hardware and a non-transitory computer readable medium that may be used as a platform for the data storage system 100.

For example, the computer 200 includes a processor 202, a data storage device 204, and an input/output interface 206. In one example, the computer is a server but other types of computers may be used. Also, the components are shown in a single computer as an example and in other examples the components may exist on multiple computers and the components may comprise multiple processors, data storage devices, interfaces, etc.

The data storage device 204 may include a hard disk, memory, etc. The data storage 204 may store any data used by the data storage system 100. The processor 202 may be a microprocessor, a micro-controller, an application specific integrated circuit (ASIC), field programmable gate array (FPGA), or other type of circuit to perform various processing functions.

In one example, the data storage system 100 includes machine readable instructions stored on a non-transitory computer readable medium, such as the data storage device 204, and executed by the processor 202 to perform the functions of the data storage system 100. For example, the load management module 110, projection manager 120 and query engine 130 may include machine readable instructions stored on the data storage device 204 as shown in FIG. 2. In another example, the data storage system 100 includes a customized circuit, such as an application-specific integrated circuit (ASIC) or field-programmable gate array (FPGA) to perform a function or multiple functions of the load management module 110, projection manager 120 and query engine 130.

The input/output (I/O) interface 206 comprises a hardware and/or a software interface. The I/O interface 206 may be a network interface connected to a network, such as the Internet, a local area network, etc. The data storage system 100 may receive data and user-input through the I/O interface 206. The data storage system 100 may be connected to the data storage 140, which may be provided on the computer 200 or on a separate computer.

The computer 200 may be a node of a distributed data storage system. For example, the computer 200 may be part of a cluster of nodes that services queries and provide data storage for multiple users or systems, and the nodes may communicate with each other to service queries and store data. The computer 200 and nodes 210-213 are shown as connected via network 220. Nodes may provide data redundancy to minimize down time in case of a node failure.

The data storage system 100 may receive an instruction (e.g., SQL statement) to create a table, tab1, with columns of different data types. An example of the statement is shown below. The columns in the table are id, f, c, v, and d. The table is partitioned on the year of column d.

Table Create Statement

```
CREATE TABLE tab1
    (id INT PRIMARY KEY,
    f FLOAT,
    i INT,
    c CHAR,
    v VARCHAR,
    d TIMESTAMP not null)
    PARTITION BY EXTRACT (YEAR FROM d);
```

The projection manager 120, shown in FIG. 1, creates a super projection for the database table that includes all the columns but does not create the database table. A user or system may set parameters for sorting, segmenting and storing the super projection in particular nodes. Below are examples of statements for creating two super projections, sp1 and sp2, segmented on columns (i) and (c, i) respectively. SELECT indicates the columns. All the columns are provided in the super projection but the order of the columns in the projection may be specified by listing the columns. FROM indicates the table having the columns. ORDER BY may be used to specify the sort field for sorting the rows in the projection. Segmented rows may be provided in their own container per segment. For example, if segmented on year, all rows for a year may be provided in corresponding storage container.

Super Projection Create Statements

```
CREATE PROJECTION sp1 AS
    SELECT i, c, v, d, f, id FROM tab1 ORDER BY id
    SEGMENTED
BY HASH(i) ALL NODES;
    CREATE PROJECTION sp2 AS
    SELECT * FROM tab1 SEGMENTED BY HASH(c, i) ALL
    NODES;
```

Examples of statements for creating aggregate projections, agg1 and agg2, are provided below. AS SELECT indicates the columns for the aggregate projection. GROUP BY means rows are grouped by each distinct value of a specified column or grouped by each distinct combination of values if multiple columns are specified in the group by clause. An aggregate function is specified for one or more columns.

Aggregate Projection Create Statements

CREATE PROJECTION agg1 AS SELECT i, max(f) max_f FROM tab1 GROUP BY i;

CREATE PROJECTION agg2 AS SELECT c, i, sum(f+i) sum_f_i, max(v) max_v, min(v) min_v FROM tab1 GROUP BY c, i;

The aggregate function specified for agg1 includes max (f), and the aggregate functions specified for agg2 include sum(f+i), max(v) and min(v), and names for the functions may be specified in the statements, such as max_f, sum_f_i, max_v and min_v. A column is created in the aggregate projection to store the results of the aggregate function.

In an example, the aggregate projection is segmented on the expression in the GROUP BY clause, and is always ordered by the expression in the GROUP BY clause. Also, in an example, if the expression in the PARTITION BY clause of the table of the projection is not included in the aggregate projection, it will be added automatically into the aggregate projection when the projection is created but invisible to the users. For example, table tab1 is partitioned by the year of column d. Thus, the statement CREATE PROJECTION agg1 AS SELECT i, max(f) max_f FROM tab1GROUP BY i can be considered as the following projection but the user who creates it, does not see the column EXTRACT(YEAR FROM d) in both the SELECT clause and GROUP BY clause: CREATE PROJECTION agg1 AS SELECT EXTRACT (YEAR FROM d) yearPart, i, max(f) max_f FROM tab1GROUP BY EXTRACT (YEAR FROM d), i. This implicitly added expression does not affect the segmentation and sort order of the aggregate projection. It is still segmented on and ordered by column, i.

Figure 3:
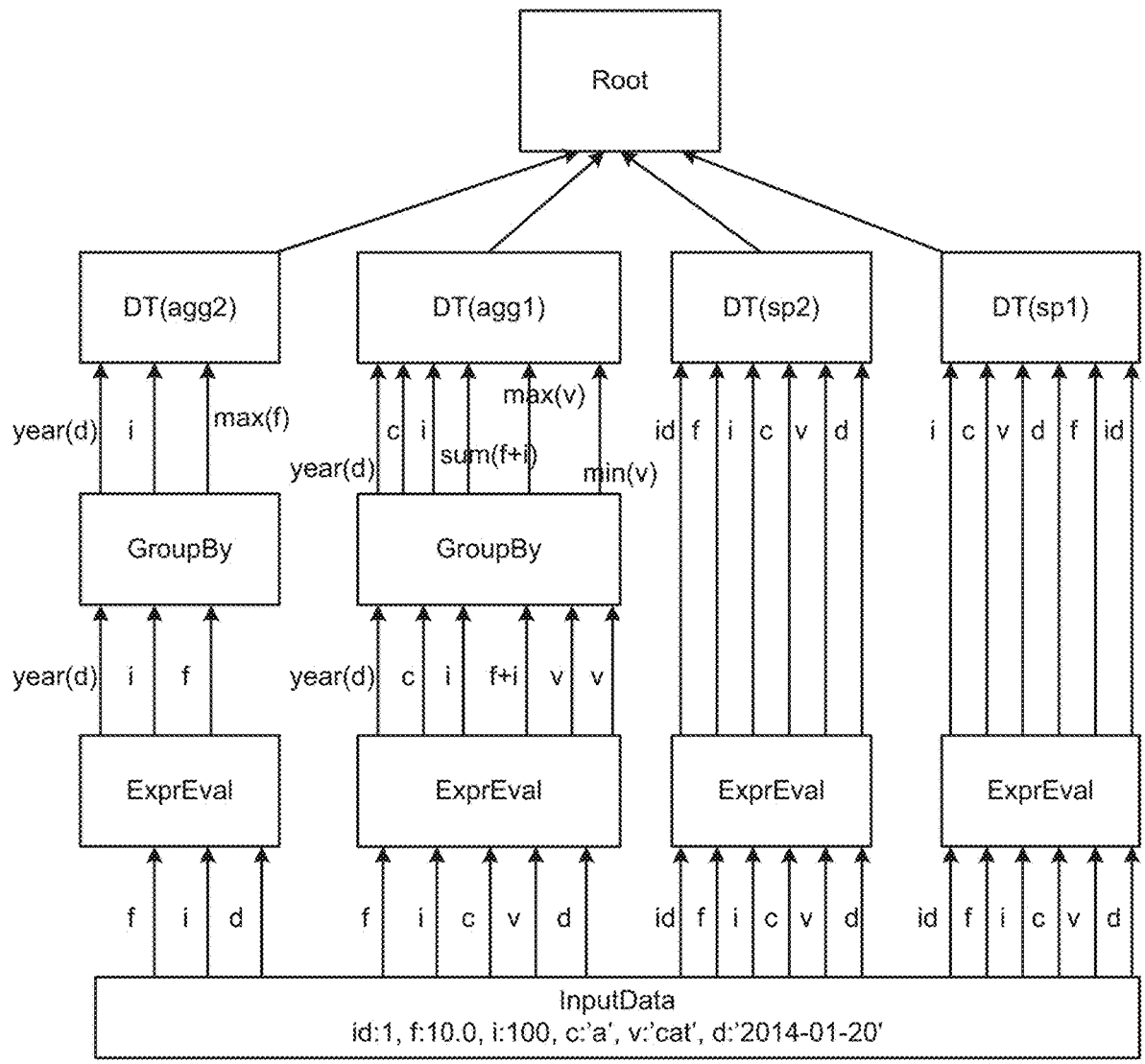
FIG. 3 shows examples of loading data into super projections and aggregate projections.

FIG. 3 illustrates the execution of the following insert query: INSERT INTO tab1 VALUES (1, 10.0, 100, 'c', 'cat', '2014-01-20'). The columns of input data, shown as InputData are in the order of the columns in table, tab1, which is [id, f, i, c, v, d]. The ExprEval operators below the data targets of super projections, DT(sp1) and DT(sp2), redirect data to the column order of the projection columns of sp1 and sp2 respectively. The ExprEval operators below the data targets of aggregate projections, DT(agg1) and DT(agg2), additionally compute (f+i) and year(d), and output appropriate data to the corresponding group by operators. The group by operators aggregate data and output them to their DT's. The expression year(d) belongs to an implicitly added column, and split data into its year-based partition. The root operator at the top returns number of rows executed by the operators below it.

Table 1 below shows the InputData from FIG. 3 bulkloaded into table tab1. The InputData includes four rows in this example.

TABLE 1

| Data for First Load | | | | | |
|---|---|---|---|---|---|
| id | f | i | c | v | d |
| 1 | 10 | 100 | 'c' | 'cat' | '2014 Jan. 20' |
| 2 | 11 | 101 | 'd' | 'dog' | '2014 Jan. 15' |
| 3 | 15 | 100 | 'c' | 'cow' | '2014 Jan. 15' |
| 4 | 17 | 101 | 'b' | 'bat' | 2012 Nov. 1' |

The actual data of the InputData shown in Table 1 is stored in projections sp1 and sp2. Table 2 shows the data of sp1 and sp2 after the first load. The columns shown in Table 2 are in the order of sp2, and sp1 has the columns ordered as i, c, v, d, f, id after the ExprEval for sp1.

TABLE 2

| Data of sp1 and sp2 after the first load | | | | | | |
|---|---|---|---|---|---|---|
| Storage Container | id | f | i | c | v | d |
| 1 | 4 | 17 | 101 | 'b' | 'bat' | 2012 Nov. 1' |
| 2 | 2 | 11 | 101 | 'd' | 'dog' | '2014 Jan. 15' |
|   | 1 | 10 | 100 | 'c' | 'cat' | '2014 Jan. 20' |
|   | 3 | 15 | 100 | 'c' | 'cow' | 2014 Jan. 5' |

Table 2 includes two different physical storage containers, each represents a partition of the same year of column d.

Table 3 and Table 4 show the aggregated data of the first load for aggregate projections agg1 and agg2 respectively after the ExprEval operators and group by operators are executed for each aggregate projection. Even though these two aggregate projections are grouped on columns (i) and (c, i) respectively, their actual group by expressions are (year (d), i) and (year(d), c, i) as explained above. All rows with the same year(d) are in the same physical storage container.

TABLE 3

Data of agg1 after the first load

| Storage Container | year(d) | i | max(f) |
|---|---|---|---|
| 1 | 2014 | 100 | 15 |
|   | 2014 | 101 | 11 |
| 2 | 2012 | 101 | 17 |

TABLE 4

Data of agg2 after the first load

| Storage Container | year(d) | c | i | sum(f + i) | max(v) | min(v) |
|---|---|---|---|---|---|---|
| 1 | 2014 | 'c' | 100 | 225 | 'cow' | 'cat' |
|   | 2014 | 'd' | 101 | 112 | 'dog' | 'dog' |
| 2 | 2012 | 'b' | 101 | 118 | 'bat' | 'bat' |

For aggregate projections, according to an example, the aggregation is done on the inserted data, and the existing data in the aggregate projections is not aggregated with the inserted data. Table 5 shows the data set of a second load (e.g., three rows of data).

TABLE 5

Data of the second load

| id | f | i | c | v | d |
|---|---|---|---|---|---|
| 5 | 20 | 100 | 'c' | 'cat' | '2014 Jan. 20' |
| 6 | 5 | 101 | 'd' | 'dog' | '2014 Jan. 15' |
| 7 | 25 | 100 | 'c' | 'cow' | '2014 Jan. 15' |

Tables 6-8 illustrate the data stored in projections sp1, sp2, agg1 and agg2 respectively after the second load. The boldface data is from the second load.

TABLE 6

Data of in sp1 and sp2 after the first load and second loads

| Storage Container | id | f | i | c | v | d |
|---|---|---|---|---|---|---|
| 1 | 4 | 17 | 101 | 'b' | 'bat' | 2012 Nov. 1' |
| 2 | 2 | 11 | 101 | 'd' | 'dog' | '2014 Jan. 15' |
|   | 1 | 10 | 100 | 'c' | 'cat' | '2014 Jan. 20' |
|   | 3 | 15 | 100 | 'c' | 'cow' | '2014 Jan. 15' |
|   | 5 | 20 | 100 | 'c' | 'cat' | '2014 Jan. 20' |
|   | 6 | 5 | 101 | 'd' | 'dog' | '2014 Jan. 15' |
|   | 7 | 25 | 100 | 'c' | 'cow' | '2014 Jan. 15' |

TABLE 7

Data of agg1 after the first and second loads

| Storage Container | year(d) | i | max(f) |
|---|---|---|---|
| 1 | 2014 | 100 | 15 |
|   | 2014 | 101 | 11 |
|   | 2014 | 100 | 25 |
|   | 2014 | 101 | 5 |
| 2 | 2012 | 101 | 17 |

TABLE 8

Data of agg2 after the first and second loads

| Storage Container | year(d) | c | i | sum(f + i) | max(v) | min(v) |
|---|---|---|---|---|---|---|
| 1 | 2014 | 'c' | 100 | 225 | 'cow' | 'cat' |
|   | 2014 | 'd' | 101 | 112 | 'dog' | 'dog' |
|   | 2014 | 'c' | 100 | 245 | 'cow' | 'cat' |
|   | 2014 | 'd' | 101 | 115 | 'dog' | 'dog' |
| 2 | 2012 | 'b' | 101 | 118 | 'bat' | 'bat' |

As shown in tables 7-8, the data of the first and second load in the aggregate projections are not aggregated together. One benefit of this strategy is that the data storage system 100 does not have to read existing data while loading new data, but the side effect is the data stored in aggregated projection is not completely aggregated. To make the partially aggregated data invisible to users, we aggregate data again at a SELECT step. For example, when a user selects data from an aggregate projection, all the data in a partition of the aggregate projection is aggregated and returned to the user. For example, if a user issues the following command: SELECT*FROM agg1, the actually plan executed looks like the plan of this query: SELECT i, max(max_f) FROM agg1 GROUP BY i.

When a table has an aggregate projection, users may be disallowed from updating its data. Similar to an update command, a delete command may not be allowed on tables with aggregate projections. However, users can drop the whole partition of that table. As discussed above, the partition expression of the table by year may be implicitly added into the aggregate projection. Data of different partitions is stored in different containers. Also, when a partition is removed (e.g., SELECT DROP_PARTITION ('tab1', 2012), all of its corresponding containers are removed without updating or touching other containers.

According to an example, each time data is inserted into a table, the data is loaded into new files. After a while, there are many files which can slow down the reading process. To avoid too many files in the data storage system 100, MERGE OUT merges data from different files of a column to one file. For an aggregate projection, all the data is aggregated again during merge-out to determine the final merged result with fully aggregated data.

If a projection is created for a table that already has data, a refresh is done to copy appropriate data into the newly created projection. If the new projection is an aggregate projection, its refreshed data is either copied from an available aggregate projection with the same definition or recomputed from its table's super projection.

Data recovery for an aggregate projection after a node in its cluster is down and brought back up is similar to the refresh process. The data can be either copied from another aggregate projection that is not affected by the node failure or recomputed from its table's super projection. If the latter happens, the aggregate projection is recovered after its table's super projections.

Figure 4:
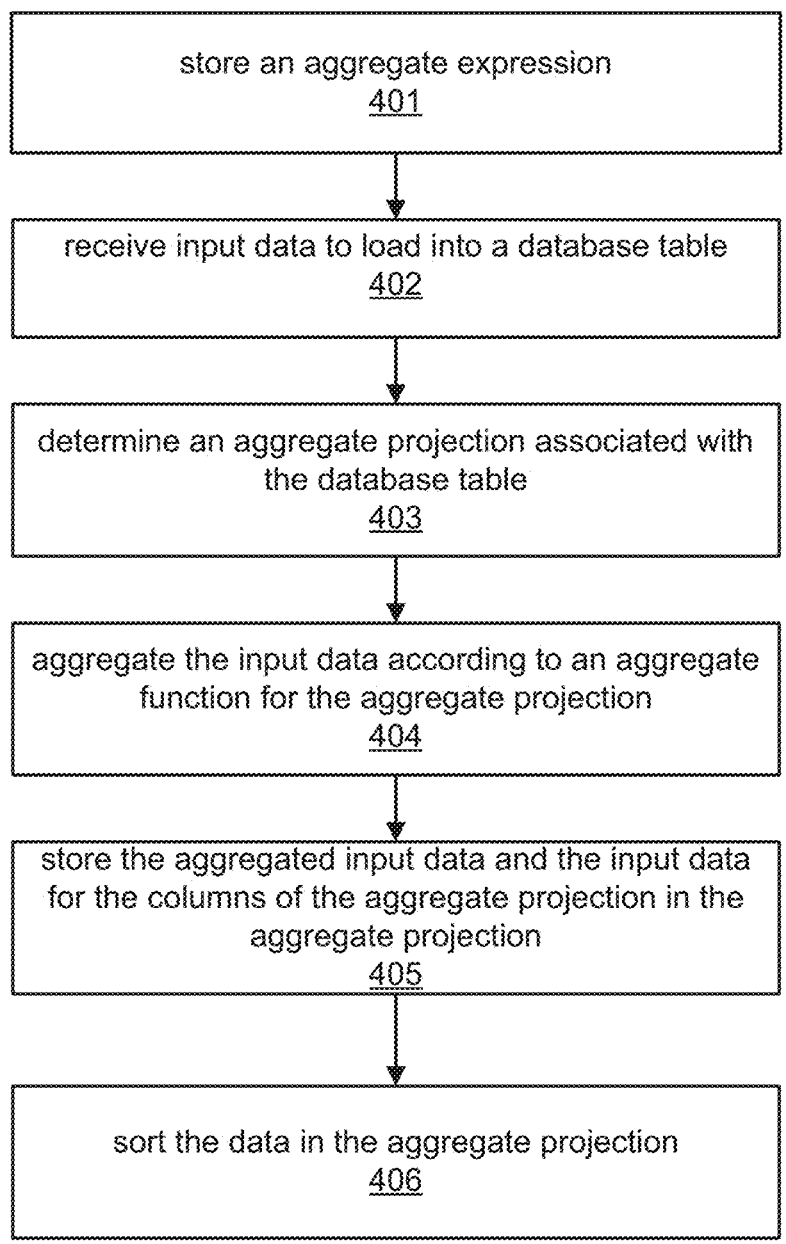
FIG. 4 shows a flow diagram of a method to load data into an aggregate projection, according to an example of the present disclosure.

FIG. 4 shows a method 400 to load data into an aggregate projection according to an example. The method 400 is described as being performed by the data storage system 100 shown in FIG. 1 but may be performed by other systems.

At 401, the data storage 150, shown in FIG. 1, stores an aggregate projection. For example, the projection manager 120 creates an aggregate projection according to a create statement that may be provided by a user or another system. The aggregate projection is a data structure to store input data and aggregated values calculated according an aggregate function associated with the aggregate projection. The aggregate function may be specified in the create statement and includes a function and a group by clause.

The aggregate projection is associated with a database table but the database table may be non-existent in the data storage system 100. For example, a database schema for the table may be stored in the data storage system 100 that identifies the columns of the database table. However, the database table is not created. Instead, projections, including super projections and aggregate projections, including columns of the database table are used to store data for the database table.

At 402, the data storage system 100 receives input data to load into a database table, and at 403, determines an aggregate projection associated with the database table. For example, the load management module 110 receives a SQL command to load input data into a database table. The load management module 110 identifies projections including at least one column for the database table (e.g., based on information in the projection catalog), and loads the input data into the projections including an identified aggregate projection.

At 404, the data storage system 100 aggregates the input data according to an aggregate function for the aggregate projection, and at 405, stores the aggregated input data and the input data for the columns of the aggregate projection in the aggregate projection.

At 406, the data storage system 100 sorts the data (e.g., the input data and the aggregated data) in the aggregate projection. Sorting includes ordering the rows in the projection according to a criteria. Sorting the data in the aggregate projection may include sorting the data as it is stored in the aggregate projection or sorting the data after it is all stored in the aggregate projection. The criteria for the sorting may be specified in the projection definition which may be used to create the aggregate projection. In other examples, the sort criteria may be predetermined or input by the user outside the projection definition or provided by another system. In addition, the data in a particular column of the aggregate projection may be sorted with respect to each or with respect to data in other columns. According to an example, the data in the aggregate projection may be sorted to enhance, e.g. maximize, performance of queries on the results data. By way of example, the data in the aggregate projection may be sorted to enable queries to run in a minimal amount of time. Furthermore, the data in the aggregate projection remains sorted according to the sorting initially performed on the data when it is loaded into the projection. For example, new data may be loaded into the aggregate projection. But the new data may not be combined with the pre-existing data in the aggregate projection and then sorted. Instead, the pre-existing data remains in its previous sort order, and the new data is sorted without including the new data with the pre-existing data in the aggregate projection. The pre-existing data in the aggregate projection may be stored in a different physical container than the new data to keep the data separated.

The data in the aggregate projection may be encoded. For instance, run-length encoding may be performed on the data to compress it. In other examples, other encoding techniques may be used. Also, the encoded data in the aggregate projection may be segmented. Segmenting may be based on a hash function or another function to distribute data across different nodes. In one example, the segmenting provides substantially even distribution of the data in the projection across some or all of the nodes in a cluster for enhanced, e.g., optimal, query execution. Thus, the data in an aggregate projection or any projection may be stored in one node or multiple nodes, and one or more copies of the data may be stored to provide redundancy in case of a failure of one of the nodes.

The aggregate function summarizes the values in each of a plurality of groups of rows of the input data according to a function. For example, the group by clause in the create statement for the aggregate projection identifies the plurality of groups of rows. For example, in the example described above where the create statement includes the aggregate function max(f) GROUP BY i. Each row of input data that has the same value of i is placed into a group. Thus, a group is created for each distinct value of i, and max(f) is computed for all the rows in the group and placed in a column of the aggregate projection. So the values off are summarized for all the rows in the group according to the function max(f).

Also, as discussed above with respect to FIG. 3, an ExprEval may be executed to determine the order of the columns for the aggregate projection and to pre-compute values for the aggregate function. For example, as shown in FIG. 3 for agg2, the ExprEval operator is executed to compute (f+i) to be used as input for sum(f+i) to calculate the aggregated values for agg2.

Also, as discussed above, new input data may not be initially aggregated with data already stored in the aggregate projection. When a SELECT command is received for the aggregate projection, the aggregate function may be executed on all the data in the aggregate projection or on all the data in a partition in the aggregate projection. Also, the data may be re-sorted. For example, all the data identified in response to the SELECT command may be sorted according to specified or predetermined criteria.

Figure 5:
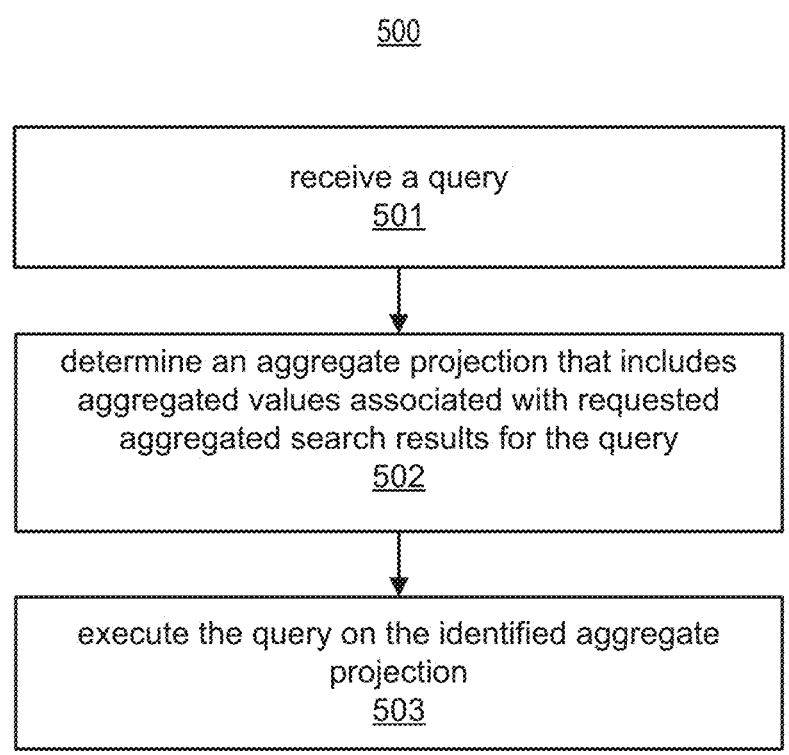
FIG. 5 shows a flow diagram of a method to execute a query, according to an example of the present disclosure.

FIG. 5 shows a method 500 to execute a query on an aggregate projection according to an example. The method 500 is described as being performed by the data storage system 100 shown in FIG. 1 but may be performed by other systems.

At 501, the query engine 130 shown in FIG. 1 receives a query. The query may be requesting aggregated search results, such as max(v) or max(f).

At 502, the query engine 130 determines from a projection catalog an aggregate projection that includes aggregated values associated with the requested aggregated search results for the query. For example, the projection catalog describes the columns of the aggregate projection and may describe the aggregate function for the aggregate projection. The query engine 130 determines whether the query includes the same aggregate function as the aggregate projection or a similar aggregate function.

At 503, the query engine 130 executes the query on the identified aggregate projection. The query results may be taken from a column of the aggregate projection that stores the aggregate values aggregated according to the aggregate function if the query is requesting the aggregate values. If no aggregate projection is stored that is related to the query, the query is executed on the super projection for the database table.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A data storage system comprising:
   a data storage;
   at least one processor; and
   a memory storing instructions that when executed cause the at least one processor to:
   create a first aggregate projection for storing data for a database table, without creating the database table, wherein the first aggregate projection includes data columns to store the data of the database table and a result column to store aggregated values resulted from an execution of a first aggregate function on the data stored in the data columns;
   store the first aggregate projection in the data storage;
   receive a load command to load input data, including a plurality of rows of values, into columns of the database table;
   in response to receiving the input data to be loaded into the database table, identify the first aggregate projection in the data storage as a projection associated with the database table, and utilize the first aggregate projection to store the input data for the database table, including loading the rows of values of the input data into the data columns of the first aggregate projection;
   execute the first aggregate function on the values in the rows of the input data in the first aggregate projection and generate aggregated input data;
   store the aggregated input data into the result column of the first aggregate projection prior to receiving a query on the first aggregate projection; and
   in response to receiving the query, determine that the query includes the first aggregate function of the first aggregate projection, and execute the query using the first aggregate projection to generate the aggregated input data from the result column of the first aggregate projection.

2. The data storage system of claim 1, wherein to execute the first aggregate function, the instructions are executable to cause the at least one processor to:
   execute an expression evaluation (ExprEval) operator to compute results of an expression of the first aggregate function; and
   pass the computed results of the expression to a group by operator, wherein the group by operator summarizes the values in each of a plurality of groups of the rows of the input data according to the first aggregate function and the computed results of the expression used as input to the first aggregate function.

3. The data storage system of claim 2, wherein the ExprEval operator orders columns of the first aggregate projection according to an order of the columns specified for the first aggregate projection.

4. The data storage system of claim 1, wherein the instructions are executable to cause the at least one processor to:
   sort the aggregated input data in the result column and the input data in the data columns of the first aggregate projection;
   receive a second load command to load new input data into the database table;
   execute the first aggregate function on the new input data and not on the data stored in the first aggregate projection prior to receiving the new input data, wherein the data stored in the first aggregate projection prior to receiving the new input data remains ordered according to the sort;
   store the new input data and results of the execution of the first aggregate function on the new input data in the first aggregate projection; and
   sort the new input data and the results of the execution of the first aggregate function on the new input data in the first aggregate projection.

5. The data storage system of claim 4, wherein the instructions are executable to cause the at least one processor to:
   receive a select command specifying data to retrieve from the first aggregate projection;
   execute the first aggregate function on all the data in the first aggregate projection or on all the data in a partition in the first aggregate projection; and
   return the results of the execution of the first aggregate function.

6. The data storage system of claim 1, wherein the first aggregate projection is partitioned by a predetermined parameter, and each partition is stored in a different physical container in the data storage, and in response to receiving a command to delete a selected partition, the selected partition is deleted without affecting other partitions in the first aggregate projection.

7. The data storage system of claim 1, wherein each time new input data is loaded into the first aggregate projection, the new input data is stored in a new file, and when the new input data in the files are merged, the first aggregate function is executed on the merged input data and stored in a merged file including the merged input data.

8. The data storage system of claim 1, wherein the instructions are executable to cause the at least one processor to store, in a projection catalog, information for each projection of a plurality of projections stored in the data storage, the information including an identifier and a schema identifying columns of the projection, wherein the plurality of projections includes the first aggregate projection.

9. The data storage system of claim 8, wherein, to create the first aggregate projection, the instructions are executable to cause the at least one processor to:
   receive a command to create the first aggregate projection;
   create a data structure for the first aggregate projection including the data columns of the database table specified in the command and the result column to store the aggregated values resulted from the first aggregate function, wherein the data columns of the first aggregate projection are ordered as specified in the command.

10. The data storage system of claim 8, wherein the instructions are executable to cause the at least one processor to:
    receive a query requesting aggregated search results;
    determine from the projection catalog whether an aggregate projection is stored in a data storage that includes the aggregated search results for the query; and
    in response to identifying that the first aggregate projection including the aggregated search results for the query, execute the query on the identified first aggregate projection.

11. A method comprising:
    creating, by a processor of a computing device, a first aggregate projection to store data for a database table in a data storage, without creating the database table to store the data, wherein the first aggregate projection is a data structure that includes data columns to store the data of the database table and a result column to store aggregated values resulted from an execution of a first aggregate function on the data stored in the data columns, wherein the first aggregate function is a function based on a predetermined query previously executed for a user;

receiving input data to be loaded into the database table;

in response to receiving the input data to be loaded into the database table, identifying the first aggregate projection as being associated with the database table;

executing, by the processor, the first aggregate function for the first aggregate projection by aggregating values of the input data and summarizing the values in each of a plurality of groups of rows of the input data;

in response to identifying the first aggregate projection as being associated with the database table, storing, by the processor, the input data in the data columns of the first aggregate projection without storing the input data in the database table;

executing, by the processor, the first aggregate function on the input data stored in the data columns of the first aggregate projection;

storing results of the execution of the first aggregate function in the result column of the first aggregate projection prior to receiving a query on the first aggregate projection; and in response to receiving the query, determining that the query includes the first aggregate function of the first aggregate projection, and executing the query using the first aggregate projection to generate the results from the result column of the first aggregate projection.

12. The method of claim 11, comprising:

sorting, by the processor, the results and the input data in the first aggregate projection;

receiving new input data for the database table;

executing the first aggregate function on the new input data and not on data stored in the first aggregate projection prior to receiving the new input data, wherein the data stored in the aggregate projection prior to receiving the new input data remains ordered according to the sorting;

storing the new input data and results of the execution of the first aggregate function on the new input data in the first aggregate projection; and sorting the new input data and the results of the execution of the first aggregate function on the new input data in the first aggregate projection.

13. The method of claim 12, comprising:

receiving a select command specifying data to retrieve from the first aggregate projection;

executing the first aggregate function on all the data in the first aggregate projection or on all the data in a partition in the first aggregate projection; and returning results of the execution of the first aggregate function.

14. A non-transitory computer readable medium including machine readable instructions executable to cause at least one processor to:

create a first aggregate projection for storing data for a database table, without creating the database table, wherein the first aggregate projection includes data columns to store the data of the database table and a result column to store aggregated values resulted from an execution of a first aggregate function on the data stored in the data columns;

receive input data to be loaded into the database table;

identify that the first aggregate projection in a data storage is associated with the database table;

in response to identifying that the first aggregate projection is associated with the database table, store the input data in the data columns of the first aggregate projection;

execute the first aggregate function on the input data stored in the data columns of the first aggregate projection;

store results of the execution of the first aggregate function in the result column of the first aggregate projection prior to receiving a query on the first aggregate projection;

receive a query requesting aggregated search results;

identify from a projection catalog that the first aggregate projection is an aggregate projection stored in the data storage that includes the requested aggregated search results for the query; and in response to identifying the first aggregate projection, execute the query on the first aggregate projection to provide the results stored in the result column of the first aggregate projection.

15. The non-transitory computer readable medium of claim 14, wherein the first aggregate function is a function based on a predetermined query previously executed for a user.

16. The non-transitory computer readable medium of claim 14, wherein the machine readable instructions are executable to cause the at least one processor to:

execute an expression evaluation (ExprEval) operator to compute results of an expression of the first aggregate function; and pass the computed results of the expression to a group by operator, wherein the group by operator summarizes the input data in the data columns of the first aggregate projection according to the first aggregate function and the computed results of the expression used as input to the first aggregate function.

17. The non-transitory computer readable medium of claim 14, wherein the machine readable instructions are executable to cause the at least one processor to:

partition the first aggregate projection by a predetermined parameter;

store each partition of the first aggregate projection in a different physical container in the data storage; and in response to receiving a command to delete a selected partition, delete the selected partition without affecting other partitions of the first aggregate projection.

* * * * *